US012035688B2

(12) United States Patent
Balson

(10) Patent No.: US 12,035,688 B2
(45) Date of Patent: Jul. 16, 2024

(54) METHOD OF USING A THERAPEUTIC BONDING MITT FOR BONDING WITH A SUGAR GLIDER

(71) Applicant: Craig Balson, San Miguel, CA (US)

(72) Inventor: Craig Balson, San Miguel, CA (US)

( * ) Notice: Subject to any disclaimer, the term of this patent is extended or adjusted under 35 U.S.C. 154(b) by 59 days.

(21) Appl. No.: 17/185,982

(22) Filed: Feb. 26, 2021

(65) Prior Publication Data
US 2022/0272943 A1    Sep. 1, 2022

(51) Int. Cl.
*A01K 13/00* (2006.01)
*A41D 19/00* (2006.01)

(52) U.S. Cl.
CPC ............... *A01K 13/00* (2013.01); *A41D 19/00* (2013.01)

(58) Field of Classification Search
CPC .................................. A01K 13/00; A41D 19/00
See application file for complete search history.

(56) References Cited

U.S. PATENT DOCUMENTS

| | | | |
|---|---|---|---|
| 1,193,529 A | 8/1916 | Ellis | |
| 1,354,241 A | 9/1920 | Carmean | |
| 1,507,707 A | 9/1924 | Morganstern | |
| 1,782,502 A | 11/1930 | Crane | |
| 1,882,179 A | 10/1932 | Daly | |
| D205,928 S | 10/1966 | Rooker | |
| 4,507,803 A * | 4/1985 | Ryan | A41D 19/01529 2/907 |
| 5,022,093 A * | 6/1991 | Hall | A63H 3/14 2/164 |
| D417,939 S | 12/1999 | Grinberg | |
| D418,660 S | 1/2000 | Ke | |
| D454,237 S | 3/2002 | Brown | |
| D457,705 S | 5/2002 | Haslet | |
| 7,578,714 B2 | 8/2009 | MacKay | |
| 8,230,523 B2 | 7/2012 | Chareyron | |
| 8,813,302 B1 * | 8/2014 | Capito | A47L 13/18 2/160 |
| D743,142 S | 11/2015 | Munson | |
| 2006/0037555 A1 * | 2/2006 | Jackson | A01K 13/00 119/601 |

(Continued)

OTHER PUBLICATIONS (http://www.youtube.com/@sugargliderdiaries; author 'Kimberly'); Episode: "The Sugar Glider Live Fall cage décor and bonding mitt demo" (https://youtube/l2w9byMEbeA?t=3541); dated Oct. 13, 2020; see timestamps noted in Non-Final Rejection date Oct. 5, 2023.*

*Primary Examiner* — Brady W Frazier
*Assistant Examiner* — Shanna Danielle Glover
(74) *Attorney, Agent, or Firm* — Sierra IP Law, PC; William K. Nelson

(57) ABSTRACT

The present invention relates to an improved bonding mitt for small animals. Embodiments of the present invention provide a therapeutic bonding mitt having a soft exterior surface comprised of fleece, a textured interior, an opening for a hand, and a webbed structure that comforts the animal being handled. The soft exterior provides a surface to cradle or pet an animal with a feel that's more comforting to the animal than that of a human hand while the interior provides a texture for grip. These elements are attached in a manner that creates a webbed structure that also enhances the therapeutic effect on the animal being handled and a hand opening that enables a user to comfortably place their hand into the therapeutic bonding mitt.

6 Claims, 7 Drawing Sheets

(56) References Cited

U.S. PATENT DOCUMENTS

| | | | |
|---|---|---|---|
| 2006/0272594 A1* | 12/2006 | Cox | A01K 13/00 |
| | | | 119/719 |
| 2008/0022943 A1* | 1/2008 | Jones | A01K 29/00 |
| | | | 119/601 |
| 2008/0034466 A1* | 2/2008 | Zicarelli | A41D 19/001 |
| | | | 2/167 |
| 2009/0038098 A1 | 2/2009 | Chareyron | |
| 2013/0185842 A1 | 7/2013 | Bonner | |
| 2014/0137307 A1* | 5/2014 | Borreau | A41D 19/0058 |
| | | | 2/69 |
| 2014/0289930 A1* | 10/2014 | Moss | A63B 71/146 |
| | | | 2/161.4 |
| 2017/0202280 A1* | 7/2017 | Groves | A41D 19/00 |
| 2020/0397209 A1* | 12/2020 | Voelker | A47L 13/18 |

\* cited by examiner

METHOD OF USING A THERAPEUTIC BONDING MITT FOR BONDING WITH A SUGAR GLIDER

FIELD OF THE INVENTION

The present invention relates to a novel device in the area of animal training. More particularly, embodiments of the present invention pertain to a therapeutic bonding mitt for small animals.

DISCUSSION OF THE BACKGROUND

While pet ownership is generally a mutually beneficial and fulfilling experience, a majority of pets typically require an adjustment period in order to become comfortable with their new owner or environment. During the adjustment period it's common for animals to be frightened, and as a result, they may react in a hostile manner towards interactions with people or other animals. The duration of the adjustment period and the reaction of the animal varies from species to species and animal to animal. For example, common household pets that have been domesticated over countless generations, such as dogs and cats, generally have a minimal adjustment period with little to no hostile interactions. However, more uncommon or exotic pets that have only been domesticated by humans relatively recently, such as hamsters or sugar gliders, generally have a longer adjustment period and may never react positively towards human interactions without proper bonding or training. However, bonding/training an animal may be also be a prolonged and painstakingly difficult process since hostile behavior, such as biting, hissing, and scratching, is still a common occurrence. This can prove especially troubling for small animals, wherein handling of the animal within one's hands is required for proper bonding. Because of these difficulties, owners may be discouraged from training their pets. While there are products intended to aid in the training of small animals, such products vastly limit the bonding from interactions between the owner and the pet. Thus, there remains a need for therapeutic bonding device that enables the owner to more easily train a small animal without frequently getting their hands bitten or scratched.

SUMMARY OF THE INVENTION

The present invention relates to an improved bonding mitt for small animals. Embodiments of the present invention provide a therapeutic bonding mitt having a soft exterior surface comprised of fleece, a textured interior, an opening for a hand, and a webbed structure that comforts the animal being handled. The soft exterior provides a surface to cradle or pet an animal with a feel that's more comforting to the animal than that of a human hand while the interior provides a texture for grip. These elements are attached in a manner that creates a webbed structure that also enhances the therapeutic effect on the animal being handled and a hand opening that enables a user to comfortably place their hand into the therapeutic bonding mitt, hereinafter referred to as "the mitt".

The present invention has a therapeutic effect that has proven to be extremely effective in training or bonding with small animals, such as sugar gliders. The therapeutic effect provides the animal with a more natural feel that soothes the animal and enables them to rest more easily. The therapeutic effect may be associated with a significant decrease in hostile behavior (e.g. biting, crabbing, hissing, growling, etc.), such that the user may train or bond with the animal more easily and confidently.

In some embodiments, the mitt has a generally circular shape that follows the outline of a splayed hand, wherein the circle narrows at the hand opening or the wrist of the hand. For such embodiments, the mitt me have a length of about 5 inches to about 12 inches (e.g., about 6 inches, about 8 inches, about 10 inches or any value or range of values therein), wherein the length is measured from the hand opening of the mitt to the tip of the mitt (the farthest point from the hand opening). Similarly, the width of the mitt may also be about 5 inches to about 12 inches (e.g., about 6 inches, about 8 inches, about 10 inches or any value or range of values therein). The size of the mitt may also vary depending range of hand sizes it's intended to support. For example, a mitt intended for children may have a length and width of about 6 inches while a mitt intended for adults may have a length and width of about 10 inches.

In some embodiments, the present invention is may also be reversible, wherein the mitt may be worn on the right or left hand by simply flipping the mitt. For example, while an iteration of the device may be designed using the shape/envelop of a right hand, the device may be flipped to reflect the shape and finger portion/sockets to align with the structure of a left hand.

The present invention may further comprise a securing mechanism, enabling the mitt to be easily fastened to hands of various sizes. The securing mechanism may be based on straps, buttons, hook-and-loop system (Velcro), snaps/press studs, zippers, buckles or a mixture thereof that enables the user to quickly fasten the mitt to their hand. For example, the securing mechanism may be simple strap lined with Velcro such that the strap may be easily adjusted to conform to hands of various sizes. In some embodiments, the securing mechanism may also be comprised of the same material as the soft exterior surface of the mitt. In other embodiments, the securing mechanism may be partially or fully enveloped in the same material as the soft exterior to minimize the animal's exposure to the securing mechanism.

In the present invention, the fleece on the exterior surface of the mitt may be comprised of fabric(s) generally utilized for its soft properties. For example, the fleece may be comprised of cashmere, chenille, cotton, jersey, wool, satin, silk, fur, leather, feathers, suede, velvet, felt or a mixture thereof that provides a more comforting feel for the animal being handled. The material that comprises the fleece may also depend on the animal(s) the mitt is intended for. For example, a mitt intended for animals with relatively fine fur, such as chinchillas, may have fleece comprised of material(s) having similar properties, such as cashmere. Such properties the fleece may mimic includes the thickness, odor, density, distribution, color, and length of the hide (e.g. coat, skin, feather, etc.) of the animal being handled.

In some embodiments, the textured interior surface of the mitt may be comprised of material(s) generally utilized for its rugged or rough feel that provides a grip to a user's hands. For example, the interior surface may be comprised of cotton, canvas, denim, corduroy, polyester fleece, or a mixture thereof that provides a grip such that a user may better handle the mitt. In some embodiments, the textured interior surface may be comprised of elastic material, such as a cotton, spandex, polyester, nylon, or a mixture thereof that enables the interior surface to stretch or deform its shape to better adapt to the user's hand during typical use, providing the user to better control the mitt. In other embodiments, the textured interior surface may be comprised of the same material as the soft exterior surface, where the mitt primarily comprising of fleece.

In some embodiments, the interior and exterior surface of the mitt may be constructed from one or more layers of the same textile wherein the shape and structure of the mitt are created based on the manner and pattern of binding the materials together. In some embodiments, the structure of the mitt may resemble a glove with webbing between each finger creating a uniform exterior that may have a comforting feel for an animal being handled. The binding mechanism may be simple stitches, glue, or a hook and loop system, or a mixture thereof that creates a durable structure with a hand opening operable to comfortably place the hand of a user. For example, textiles that have a soft superior surface and a rugged/textured inferior surface may be folded and sewn together in a manner that creates the structure of the mitt wherein the soft surface of the textile is on the exterior, including on the webbing between each figure, and the textured surface is in the interior. In other embodiments, the interior and exterior surfaces may be comprised from two separate materials that must be attached in a certain manner via a binding mechanism. For example, some embodiments of the mitt may comprise interior that creates a finger sockets and enveloping the glove in fleece to create the soft exterior.

In the present invention, a hand opening is provided to allow the user to comfortably place their hand in and control the mitt with ease. The hand opening may further comprise a finger portion, containing two or more finger sockets within the mitt, each operable to hold at least one finger of the user to provide them with more control over the mitt. In some embodiments, the area between each finger socket may be spaced apart from the adjacent finger socket(s). In other embodiments, the finger sockets may be connected by webbing, wherein the shape of the mitt resembles the finger arrangement of a baseball glove, with the thumb separated from the other digits by a large webbing between the thumb and forefinger. In other examples, the mitt may have two finger sockets, the first intended for a thumb of a hand and the second intended for the rest of the fingers, leading to a structure that resembles an oven mitt. The webbing may be a part of the soft exterior surface or comprised of the same material such that there is no discontinuity between the type of material on the exterior of the mitt. In some embodiments, the area between each finger socket may comprise a gap between fingers with webbing of the felt material. In some embodiments, threading made from elastic material (e.g., polyether-polyurea copolymer threads, or other elastomeric material) may be threaded through the webbing to give the mitt more resiliency and prevent sagging areas in the fabric. There may also be cutouts in the webbing in the areas between the distal ends of the fingers, such as shallow semi-circular cutouts that do not significantly impact the continuous soft surface of the mitt and provide more economic use of the fabric, reducing material cost.

Several embodiments of the present invention are described herein to illustrate the invention and are exemplary in nature, but the invention is not limited to such embodiment. In one aspect, the present invention is a therapeutic bonding mitt for bonding with animals comprising: a soft exterior surface comprised of fleece, a textured interior surface, and a hand opening operable to receive the hand of a user and further comprising a finger portion having a webbed structure. The soft exterior surface and webbed structure enables said user to have a therapeutic effect on an animal being handled with said therapeutic bonding mitt.

The fleece may be comprised of cashmere, chenille, cotton, jersey, wool, satin, silk, fur, leather, feathers, suede, velvet, felt or a mixture thereof. The fleece may have properties similar to the hide properties of the animal intended to be handled by said therapeutic bonding mitt. The textured interior surface may be elastic such that its shape is operable to conform to said user's hand. The textured interior surface may be comprised rough material that provides a grip to said user's hand. The rough material may be cotton, canvas, denim, corduroy, polyester fleece, spandex, polyester, nylon or a mixture thereof. The textured interior surface may be comprised of same fleece as the soft exterior surface. The finger portion may comprise one or more finger sockets operable to hold at least one finger and provide said user with more control over the therapeutic bonding mitt. The webbed structure may be comprised of said fleece and may link one or more finger sockets. The therapeutic bonding mitt may further comprise a securing mechanism operable to fasten said therapeutic bonding mitt to hands of various sizes. The securing mechanism may be comprised of or at least partially enveloped in said fleece. The therapeutic bonding mitt may have a generally circular shape that follows the outline of a splayed hand and narrows on said hand opening. The therapeutic bonding mitt may have a length and width of about 5 inches to about 12 inches.

In second aspect, the present invention is a method of using a therapeutic bonding mitt for bonding with animals comprising: providing bonding mitt having a soft exterior surface comprised of fleece, a textured interior surface, and a hand opening operable to receive the hand of a user and further comprising a finger portion having a webbed structure; and cuddling and petting the animal with a stroking motion over the fur of the animal. The soft exterior surface and webbed structure enables said user to have a therapeutic effect on an animal being handled with said therapeutic bonding mitt. The fleece may be comprised of cashmere, chenille, cotton, jersey, wool, satin, silk, fur, leather, feathers, suede, velvet, felt or a mixture thereof. The fleece may have properties similar to the hide properties of the animal intended to be handled by said therapeutic bonding mitt. The textured interior surface may be elastic such that its shape is operable to conform to said user's hand. The therapeutic bonding mitt may have a generally circular shape that follows the outline of a splayed hand and narrows on said hand opening. The therapeutic bonding mitt may have a length and width of about 5 inches (12.7 cm) to about 12 inches (30.48 cm).

In third aspect, the present invention is a method of creating therapeutic bonding mitt for bonding with animals comprising: selecting a fleece to create a soft exterior surface, selecting a textile to create a textured interior surface, and utilizing a binding mechanism to attach the fleece and textile in a manner that creates a hand opening operable to receive the hand of a user and further comprising a finger portion having a webbed structure, wherein the soft exterior surface and webbed structure enables the user to have a therapeutic effect on an animal being handled with the therapeutic bonding mitt. The fleece may be selected from the following: cashmere, chenille, cotton, jersey, wool, satin, silk, fur, leather, feathers, suede, velvet, felt or a mixture thereof. The fleece may also be selected according to the hide properties of the animal intended to be handled by said therapeutic bonding mitt. The textile may be selected to be elastic such that its shape is operable to conform to said user's hand. The textile may be selected to be comprised of rough material that provides a grip to said user's hand. The textile may be selected from the following: cotton, canvas, denim, corduroy, polyester fleece, spandex, polyester, nylon or a mixture thereof. The textile could also be selected to be of the same material as the fleece. The finger portion may comprise one or more finger sockets operable to hold at least one finger and provide said user with more control over said therapeutic bonding mitt. The therapeutic bonding mitt may further comprise utilizing a securing mechanism operable to fasten said therapeutic bonding mitt to hands of various sizes. The binding mechanism may comprise stitches, glue, straps, a hook and loop system, folding, tying, or a mixture thereof.

It is an object of the present invention to provide a therapeutic bonding mitt operable to enable the user to have a therapeutic effect on an animal while handling them with the therapeutic bonding mitt.

It is also an object of the present invention to provide bonding mitt having a therapeutic bonding mitt that enables the user to bond or train with an animal more easily and confidently.

It is also an object of the present invention to provide a bonding mitt that may be easily fastened and controlled for handling an animal.

It is also an object of the present invention to provide a soft exterior surface with a webbed structure that has a therapeutic effect on animals.

DETAILED DESCRIPTION

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention as defined by the claims. In the following disclosure, specific details are given to provide a thorough understanding of the invention. However, it will be apparent to one skilled in the art that the present invention may be practiced without these specific details.

Figure 1:
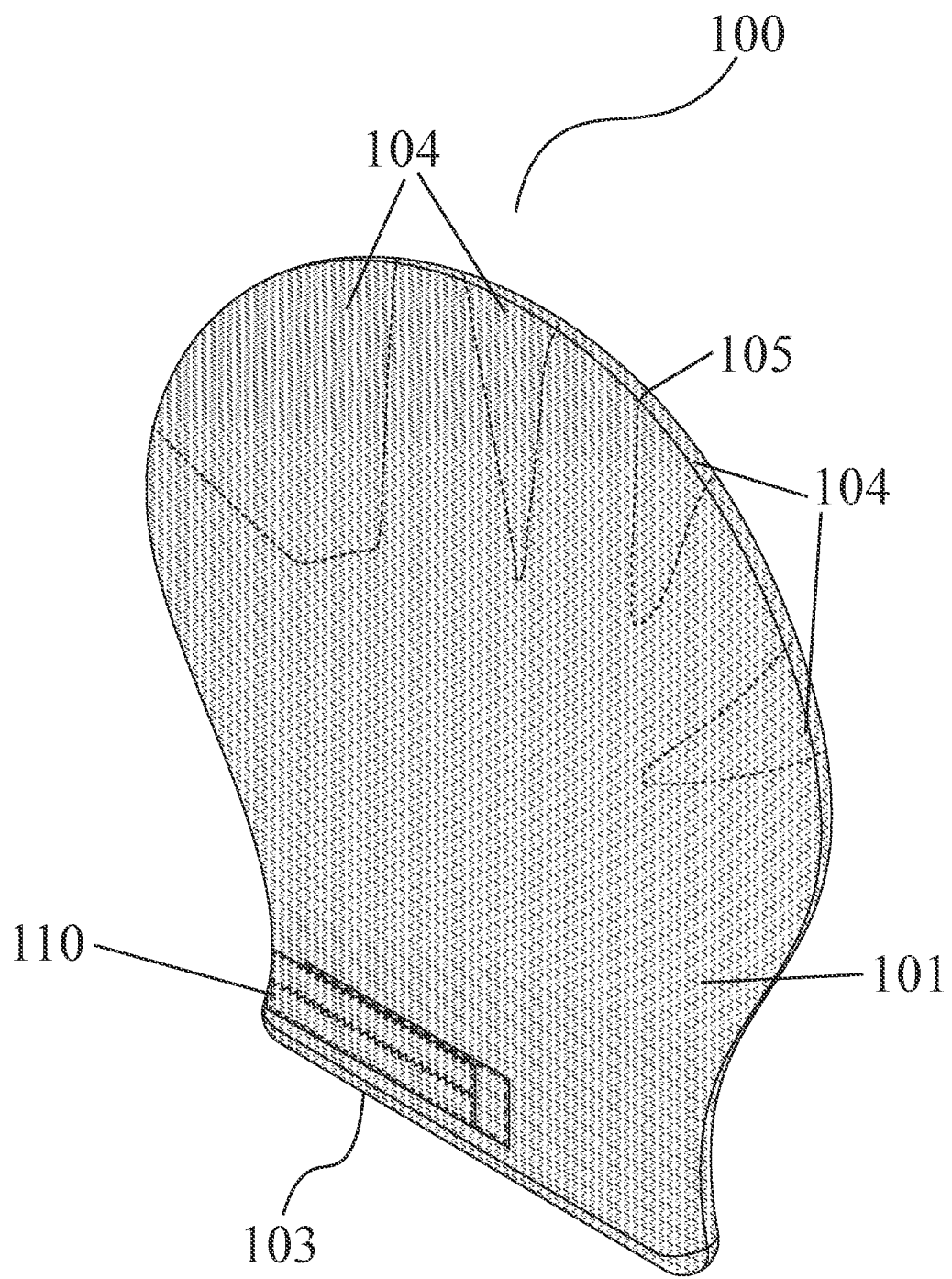
FIG. 1 provides an isometric view of the front of a therapeutic bonding mitt, according to an embodiment of the present invention.

The present invention relates to an improved bonding mitt for small animals. As shown in FIG. 1, embodiments of the present invention provide a therapeutic bonding mitt 100 having a soft exterior surface 101 comprised of fleece, a textured interior 102 (shown in FIG. 7), an opening for a hand 103, and a webbed structure 104 that comforts the animal being handled. The soft exterior 101 provides a surface to cradle or pet an animal with a feel that's more comforting to the animal than that of a human hand while the interior 102 provides a texture for grip. These elements are attached in a manner that creates a webbed structure 104 that also enhances the therapeutic effect on the animal being handled and a hand opening that enables a user to comfortably place their hand into the therapeutic bonding mitt, hereinafter referred to as the mitt.

As shown in FIG. 1, the fleece on the exterior surface 101 of the mitt 100 may be comprised of fabric(s) generally utilized for its soft properties. For example, the fleece may be comprised of cashmere, chenille, cotton, jersey, wool, satin, silk, fur, leather, feathers, suede, velvet, felt or a mixture thereof that provides a more comforting feel for the animal being handled. The material that comprises the fleece may also depend on the animal(s) the mitt is intended for. For example, a mitt intended for animals with relatively fine fur, such as chinchillas, may have fleece comprised of material(s) having similar properties, such as cashmere. Such properties the fleece may mimic includes the thickness, odor, density, distribution, color, and length of the hide (e.g. coat, skin, feather, etc.) of the animal being handled.

Figure 7:
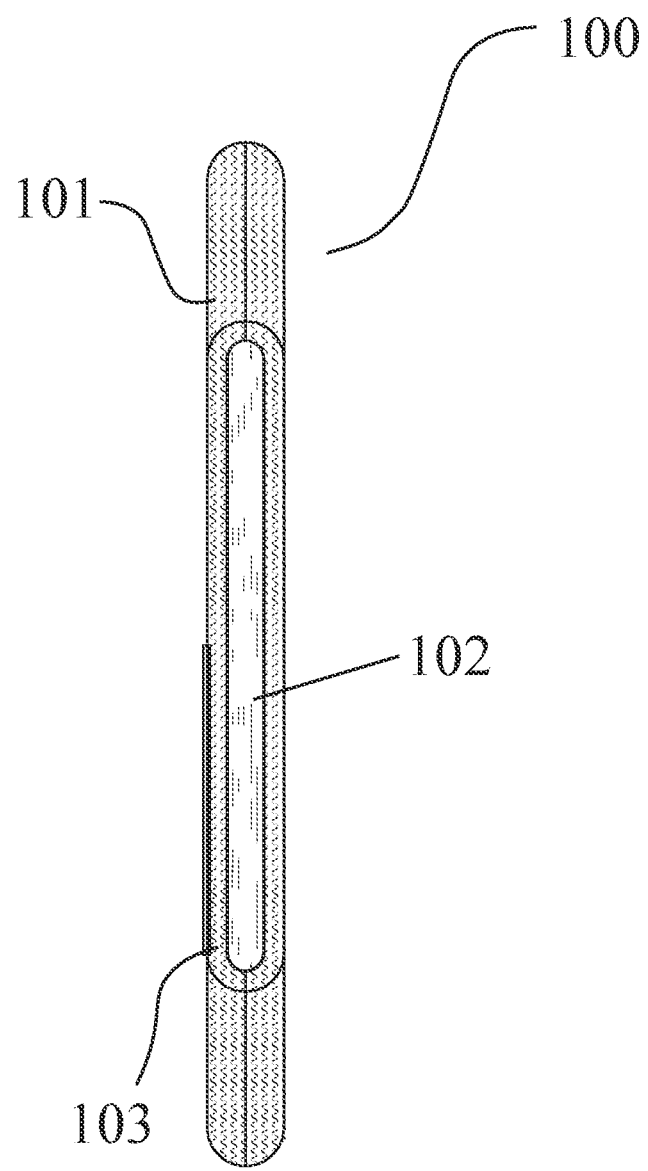
FIG. 7 provides a bottom view of a therapeutic bonding mitt, according to an embodiment of the present invention.

As shown in FIG. 7, the textured interior surface 102 of the mitt 100 may be comprised of material(s) generally utilized for its rugged or rough feel that provides a grip to a user's hands. For example, the interior surface may be comprised of cotton, canvas, denim, corduroy, polyester fleece, or a mixture thereof that provides a grip such that a user may better handle the mitt. In some embodiments, the textured interior surface 102 may be comprised of elastic material, such as a cotton, spandex, polyester, nylon, or a mixture thereof that enables the interior surface to stretch or distort its shape to better adapt to the user's hand during typical use, providing the user to better control the mitt. In other embodiments, the textured interior surface 102 may be comprised of the same material as the soft exterior surface 101, leading to the mitt 100 primarily comprising of fleece.

In some embodiments, the interior 101 and exterior 102 surface of the mitt may be the inferior and superior surface of a common textile wherein the shape and structure of the mitt are created based on the manner of construction and the binding mechanism utilized. As shown in FIG. 1, in some embodiments, the structure of the mitt 100 with webbing 104 between each finger creating a uniform exterior that may have a comforting feel for an animal being handled, especially those with webbed appendages such as sugar gliders. The binding mechanism 105 may be simple stitches, glue, straps, a hook and loop system, or a mixture thereof that creates a durable structure with a hand opening operable to comfortably place the hand of a user. For example, textiles that have a soft superior surface and a rugged/textured inferior surface may be folded and sewn together in a manner that creates the structure of the mitt 100 wherein the soft surface of the textile is on the exterior, including on the webbing 104 between each figure, and the textured surface is in the interior. In other embodiments, the interior and exterior surfaces may be comprised from two separate materials that must be attached in a certain manner via a binding mechanism. For example, some embodiments of the mitt may comprise utilizing a rubber interior for the textured interior and enveloping the glove in fleece via the binding mechanism to create the soft exterior.

Figure 2:
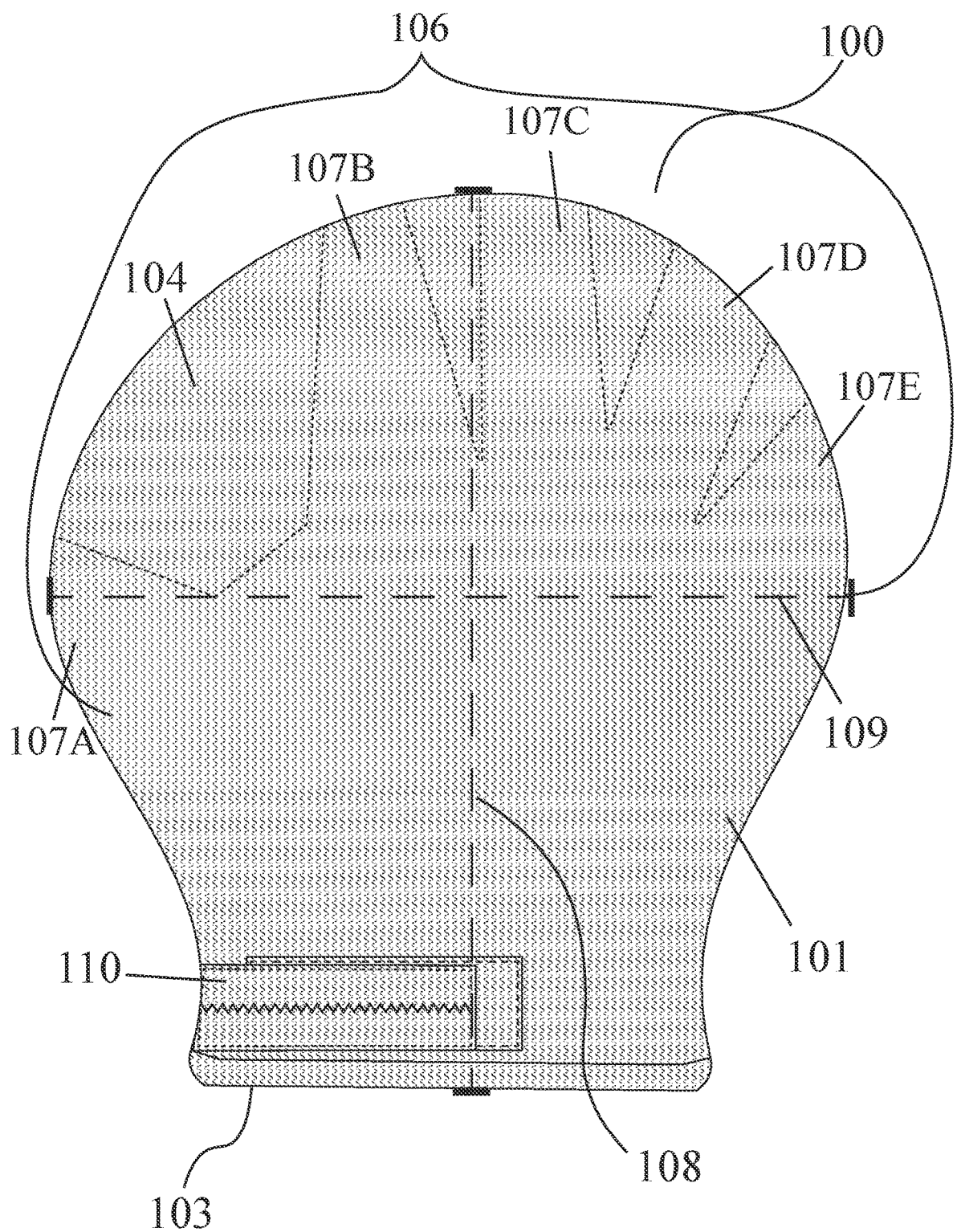
FIG. 2 provides a front view of a therapeutic bonding mitt, according to an embodiment of the present invention.
Figure 3:
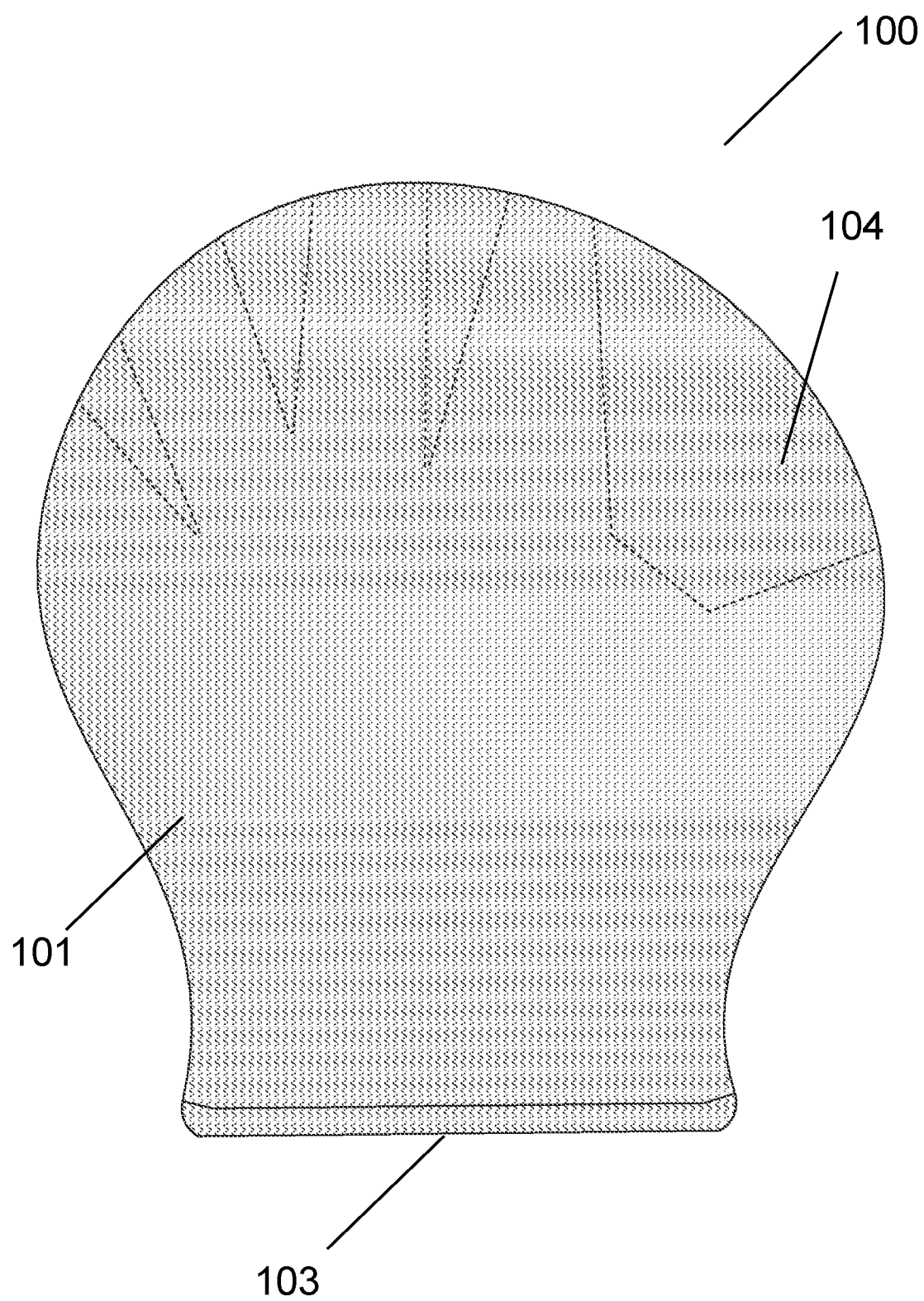
FIG. 3 provides a back view of a therapeutic bonding mitt, according to an embodiment of the present invention.
Figure 4:
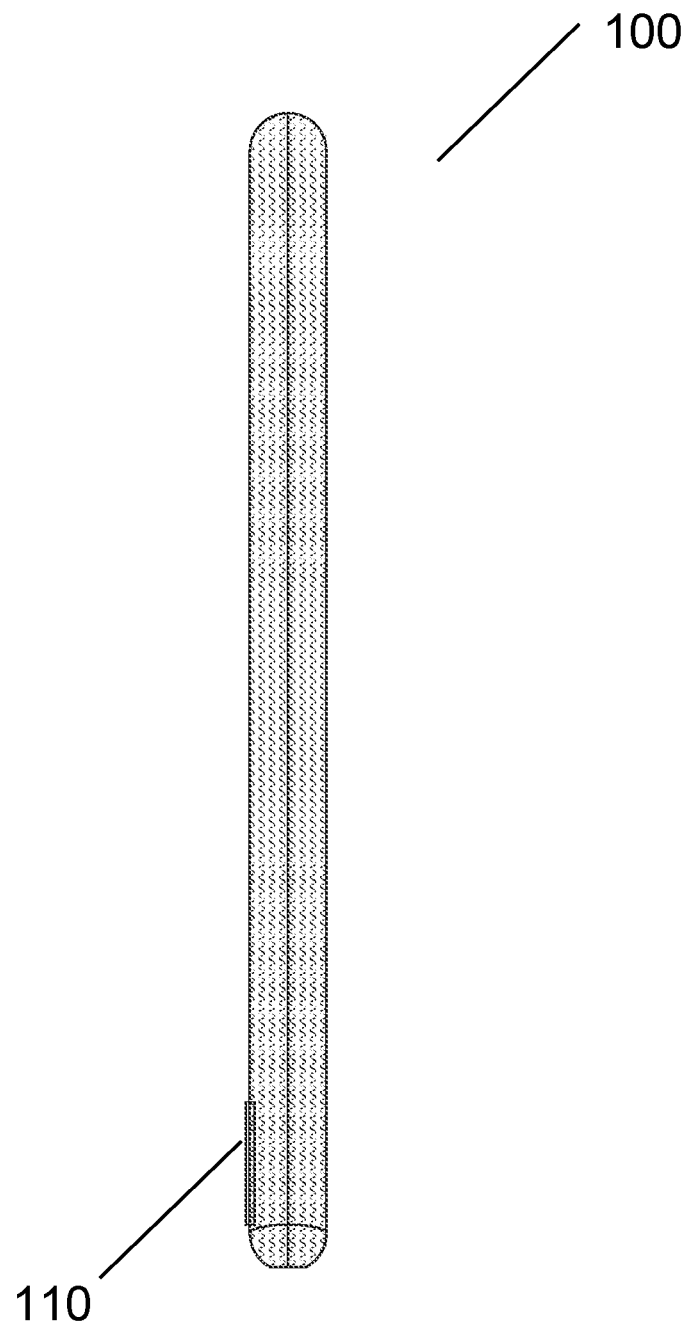
FIG. 4 provides a right side view of a therapeutic bonding mitt, according to an embodiment of the present invention.
Figure 5:
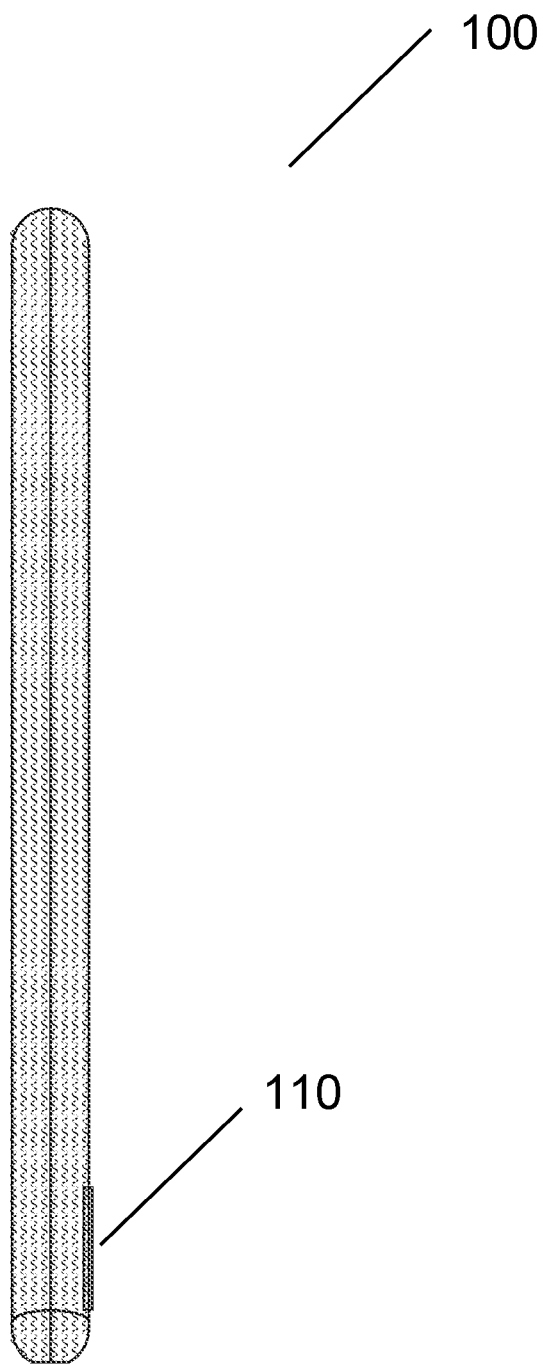
FIG. 5 provides a left side view of a therapeutic bonding mitt, according to an embodiment of the present invention.
Figure 6:
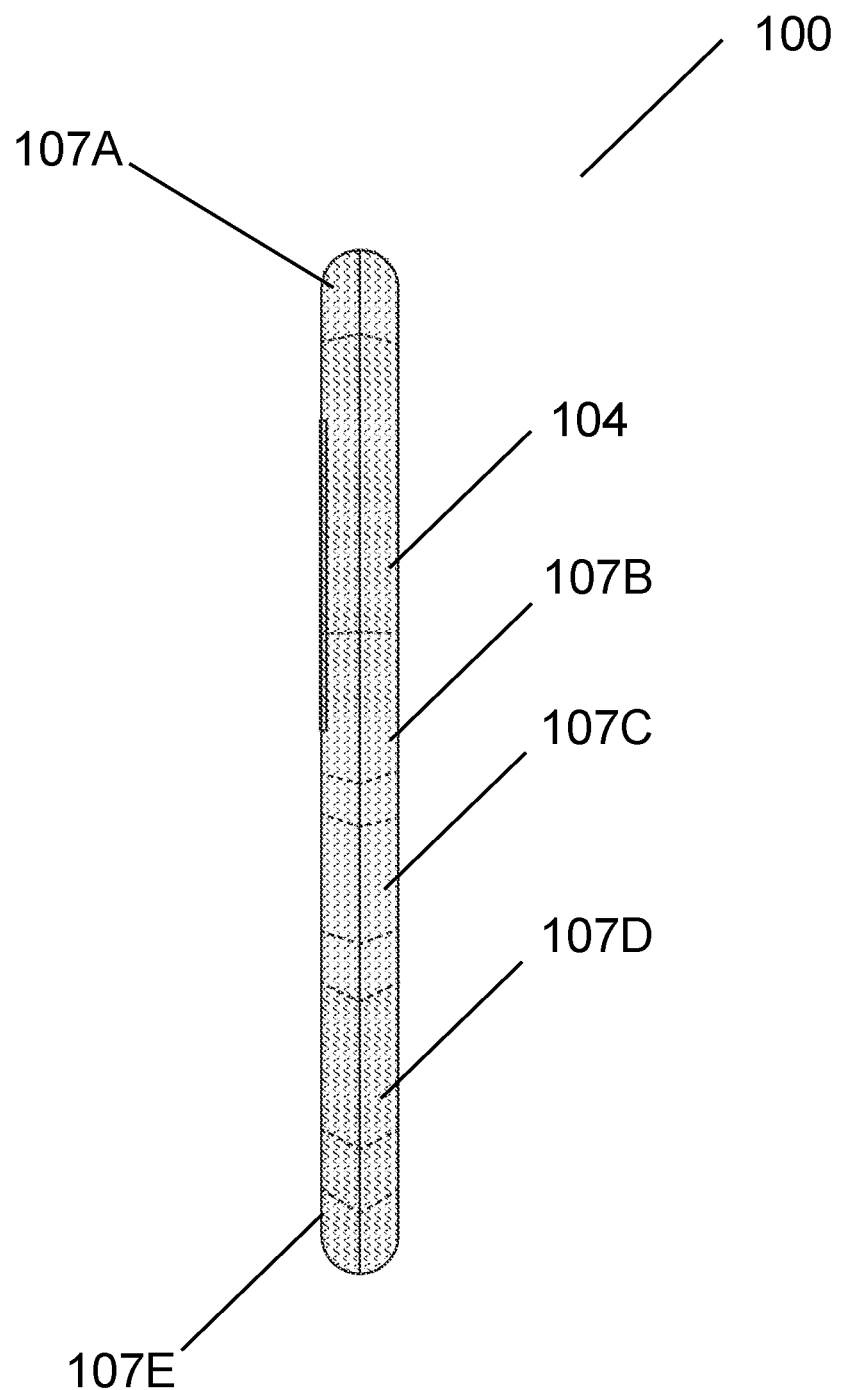
FIG. 6 provides a top view of a therapeutic bonding mitt, according to an embodiment of the present invention.

As shown in FIG. 2, the present invention comprises a hand opening 103 is provided to allow the user to comfortably place their hand in and control the mitt with ease. The hand opening may further comprise a finger portion 106, containing two or more finger sockets 107 within the mitt, each operable to hold at least one finger of the user to provide them with more control over the mitt. In some embodiments, the area between each finger socket may be spaced apart from the adjacent finger. In other embodiments, the finger sockets may be connected by webbing 104, wherein the shape of the mitt resembles a baseball glove with the thumb separated from the other fingers by a wide webbing. In other examples, the mitt may have two finger sockets, the first intended for a thumb of a hand and the second intended for the rest of the fingers, leading to a structure that resembles an oven mitt. The webbing may be a part of the soft exterior surface 101 or comprised of the same material such that there is no discontinuity between the type of material on the exterior of the mitt. In some embodiments, the area between each finger socket may comprise a gap between fingers with webbing 104 of the felt material. In some embodiments, threading made from elastic material (e.g., polyether-polyurea copolymer threads, or other elastomeric material) may be threaded through the webbing 104 to give the mitt more resiliency and prevent sagging areas in the fabric. There may also be cutouts in the webbing 104 in the areas between the distal ends of the fingers, such as shallow semi-circular cutouts that do not significantly impact the continuous soft surface of the mitt and provide more economic use of the fabric, reducing material cost.

The present invention has a therapeutic effect that has proven to be extremely effective in training or bonding with small animals, such as sugar gliders. The therapeutic effect provides the animal with a more natural feel that soothes the animal and enables them to rest more easily. The therapeutic effect may be associated with a significant decrease in hostile behavior (e.g. biting, crabbing, hissing, growling, etc.), such that the user may train or bond with the animal more easily and confidently.

As shown in FIG. 2, the mitt 100 has a generally circular shape that follows the outline of a splayed hand, wherein the circle narrows at the hand opening 103 or the wrist of the hand. For such embodiments, the mitt 100 me have a length 108 of about 5 inches (12.7 cm) to about 12 inches (30.48 cm) (e.g., about 6 inches [15.24 cm], about 8 inches [20.32 cm], about 10 inches [25.4 cm] or any value or range of values therein), wherein the length is measured from the hand opening of the mitt to the tip of the mitt (the farthest point from the hand opening). Similarly, the width 109 of the mitt may also be about 5 inches (12.7 cm) to about 12 inches (30.48 cm) (e.g., about 6 inches [15.24 cm], about 8 inches [20.32 cm], about 10 inches [25.4 cm] or any value or range of values therein). The size of the mitt may also vary depending range of hand sizes it's intended to support. For example, a mitt intended for children may have a length and width of about 6 inches while a mitt intended for adults may have a length and width of about 10 inches (25.4 cm).

In some embodiments, the present invention is may also be reversible, wherein the mitt may be worn on the right or left hand by simply flipping the mitt. For example, while an iteration of the device may be designed using the shape/envelop of a right hand, the device may be flipped to reflect the shape and finger portion/sockets to align with the structure of a left hand.

As shown in FIG. 1 and FIG. 2, the present invention may further comprise a securing mechanism 110, enabling the mitt to be easily fastened to hands of various sizes. The securing mechanism 110 may be based on straps, buttons, hook-and-loop system (Velcro), snaps/press studs, zippers, buckles or a mixture thereof that enables the user to quickly fasten the mitt to their hand. For example, the securing mechanism 110 may be simple strap lined with Velcro such that the strap may be easily adjusted to conform to hands of various sizes. In some embodiments, the securing mechanism 110 may also be comprised of the same material as the soft exterior surface of the mitt. In other embodiments, the securing mechanism may be partially or fully enveloped in the same material as the soft exterior to minimize the animal's exposure to the securing mechanism.

It should be understood that the foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, and to thereby enable others skilled in the art to best utilize the invention and various embodiments with various modifications as are suited to the particular use contemplated.

What is claimed:

1. A method of using a therapeutic bonding mitt for binding with a sugar glider comprising:
    a. providing a therapeutic bonding mitt having
        i. a soft exterior surface comprising a fleece material having a first texture,
        ii. an interior surface having a second texture, and
        iii. a hand opening operable to receive the hand of a user comprising finger sockets and webbed sections linking adjacent finger sockets, including the finger sockets for the thumb and index finger, and
    b. petting a sugar glider with a stroking motion over the fur of the sugar glider while wearing the therapeutic bonding mitt, wherein said therapeutic bonding mitt includes no vibrational or sonic devices.

2. The method of claim 1, wherein said fleece comprises cashmere, chenille, cotton, jersey, wool, satin, silk, fur, or a mixture thereof.

3. The method of claim 1, wherein said textured interior surface is elastic such that its shape is operable to conform to said user's hand.

4. The method of claim 1, wherein the therapeutic bonding mitt has a generally circular shape that follows the outline of a splayed hand and narrows on said hand opening.

5. The method of claim 1, wherein the therapeutic bonding mitt may have a length and width of about 5 inches to about 12 inches.

6. The method of claim 1, wherein said soft exterior surface consists of said fleece material.

* * * * *